US006728708B1

(12) United States Patent
Yotka et al.

(10) Patent No.: US 6,728,708 B1
(45) Date of Patent: Apr. 27, 2004

(54) RELATIONAL AND SPATIAL DATABASE MANAGEMENT SYSTEM AND METHOD FOR APPLICATIONS HAVING SPEECH CONTROLLED DATA INPUT DISPLAYABLE IN A FORM AND A MAP HAVING SPATIAL AND NON-SPATIAL DATA

(75) Inventors: John Anthony Yotka, Aurora, CO (US); Daniel Eugene Bender, Elizabeth, CO (US); Steven Thomas Cox, Highlands Ranch, CO (US); Frederick Lamont Norman, Boulder, CO (US)

(73) Assignee: Datria Systems, Inc., Englewood, CO (US)

( * ) Notice: Subject to any disclaimer, the term of this patent is extended or adjusted under 35 U.S.C. 154(b) by 0 days.

(21) Appl. No.: 09/603,851

(22) Filed: Jun. 26, 2000

(51) Int. Cl.[7] .................................................. G06F 17/30

(52) U.S. Cl. ................................ 707/6; 707/3; 707/10; 707/102; 707/104

(58) Field of Search ............................. 707/3, 10, 102, 707/104.1, 6, 104; 345/433; 701/201, 208, 211; 340/36; 704/9

(56) References Cited

U.S. PATENT DOCUMENTS

| | | | | | |
|---|---|---|---|---|---|
| 5,596,744 | A | * | 1/1997 | Dao et al. | 707/10 |
| 5,682,525 | A | | 10/1997 | Bouve et al. | 707/104.1 |
| 5,835,907 | A | * | 11/1998 | Newman | 707/10 |
| 5,948,040 | A | | 9/1999 | DeLorme et al. | 701/201 |
| 5,966,135 | A | * | 10/1999 | Roy et al. | 345/433 |
| 5,977,884 | A | * | 11/1999 | Ross | 340/36 |
| 5,978,804 | A | * | 11/1999 | Dietzman | 707/10 |
| 5,987,380 | A | | 11/1999 | Backman et al. | 701/208 |
| 6,014,661 | A | | 1/2000 | Ahlberg et al. | 707/3 |
| 6,108,662 | A | * | 8/2000 | Hoskins et al. | 707/102 |
| 6,161,105 | A | * | 12/2000 | Keighan et al. | 707/100 |
| 6,272,457 | B1 | * | 8/2001 | Ford et al. | 704/9 |
| 6,307,573 | B1 | * | 10/2001 | Barros | 345/764 |
| 6,385,622 | B2 | * | 5/2002 | Bouve et al. | 707/104.1 |
| 6,408,307 | B1 | * | 6/2002 | Semple et al. | 707/104.1 |
| 6,411,899 | B2 | * | 6/2002 | Dussell et al. | 701/211 |
| 6,415,291 | B2 | * | 7/2002 | Bouve et al. | 707/10 |

FOREIGN PATENT DOCUMENTS

| | | | |
|---|---|---|---|
| EP | 0 614 151 A1 | | 9/1994 |
| WO | WO 00/04734 | * | 1/2000 |

* cited by examiner

*Primary Examiner*—Thuy N. Pardo
(74) *Attorney, Agent, or Firm*—Gibson, Dunn & Crutcher LLP; Stanley J. Gradisar

(57) ABSTRACT

A relational and spatial database management system and method designed to more accurately and efficiently generate and manage relational and spatial databases for commercial and/or personal use. The invention generally comprises one or more sensor devices, a computer, and software. The invention may be deployed on a portable computer thereby allowing a user to operate the system in the field and gather data while moving around. The software is configurable and programmable for many different applications. The software system can simultaneously take inputs from one or more sensor devices, record the inputs in a relational and/or spatial database, and display the data in a form that is easy to manipulate. The Graphical User Interface displays a visual presentation of the form alongside a map of the geographic location of interest where data is being collected.

13 Claims, 11 Drawing Sheets

START
LOAD RSDM SOFTWARE AND CHOOSE APPLICATION — 1000
DISPLAY MAP ON PORTION OF DISPLAY — 1002
DISPLAY FORM ON PORTION OF DISPLAY — 1004
MOVE TO FIRST/NEXT LOCATION OF INTEREST — 1006
UPDATE DISPLAY WITH CURRENT LOCATION — 1008
EXISTING LOCATION MATCH ? — 1010 (Yes / No)
POPULATE FORM WITH EXISTING DATA — 1014
BEGIN DATA UPDATE USING VOICE COMMANDS, CONVENTIONAL INPUTS, AND SENSOR DEVICES — 1016
BEGIN DATA ENTRY USING VOICE COMMANDS, CONVENTIONAL INPUTS, AND SENSOR DEVICES — 1012
FINISHED ? — 1018 (No / Yes)
End

RELATIONAL AND SPATIAL DATABASE MANAGEMENT SYSTEM AND METHOD FOR APPLICATIONS HAVING SPEECH CONTROLLED DATA INPUT DISPLAYABLE IN A FORM AND A MAP HAVING SPATIAL AND NON-SPATIAL DATA

FIELD OF THE INVENTION

This invention relates to relational and spatial databases, and more particularly, to a method and system that more accurately and efficiently generates and manages relational and spatial databases through employing one or more sensor devices, a computer, and a software system.

BACKGROUND OF THE INVENTION

Most business and operational processes are built on access to reliable information. In many cases, this information resides in relational and spatial databases. But for many organizations, especially those with a large number of workers in the field, getting that information to the field is a difficult task. Workers need to be able to access and use the data easily and effortlessly in their day-to-day activities. In addition, the information in the databases need to be kept current and accurate. The present invention helps to solve these and other problems in the art.

SUMMARY OF THE INVENTION

It is an aspect of the present invention to enable mobile field workers to interface with existing information in a relational and spatial database.

Yet another aspect of the invention is to create a mobile computing environment that blends a forms interface with speech recognition capabilities.

Still another aspect of the invention is to access existing data in a relational and spatial database from a mobile computing environment, gather and store new data collected in the field, and correct existing data stored in the relational and spatial database with the newly collected data.

DETAILED DESCRIPTION OF THE INVENTION

Figure 1:
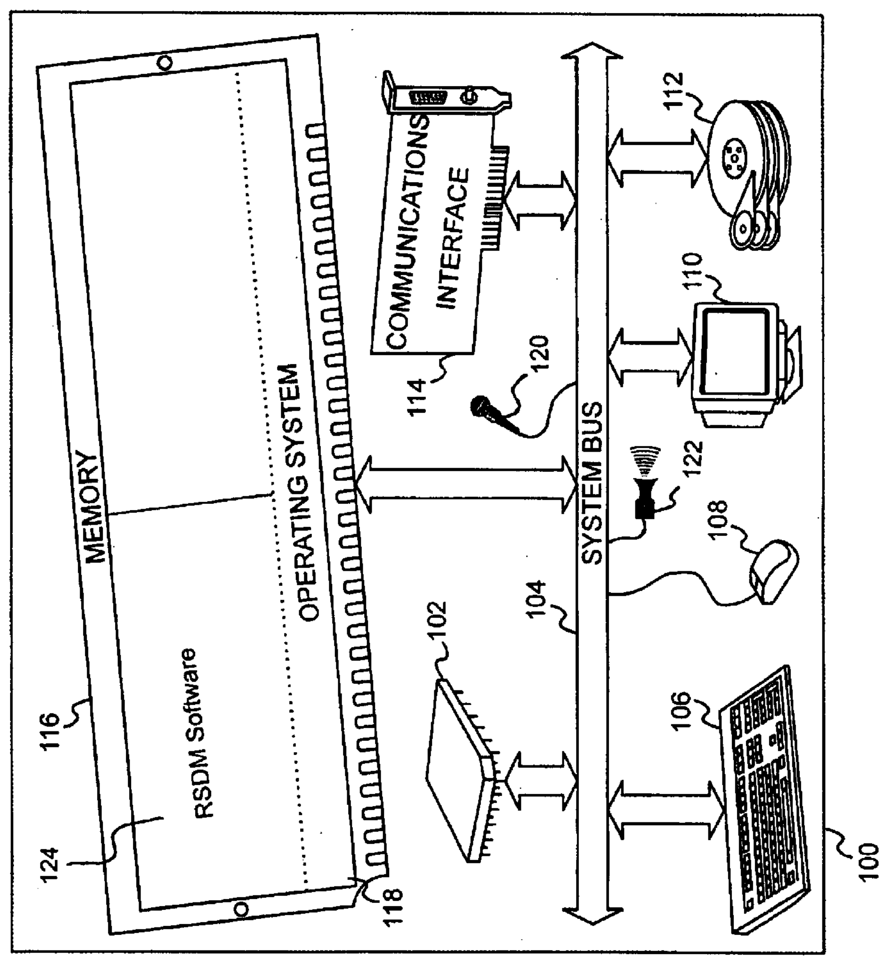
FIG. 1 shows a schematic/block diagram of a computer system incorporating an embodiment of the present invention.

FIG. 1 shows a schematic/block diagram of a computer system incorporating an embodiment of the present invention. The computer system may be a portable computer system, thereby allowing a user to operate the system while moving around, as well as a no-potable computer system. Also, the present invention utilizes the teachings of commonly owned application Ser. No. 08/714,583 filed Sep. 16, 1996, now U.S. Pat. No. 6,272,457 titled "Spatial Asset Management System" which is hereby incorporated by reference for all that is taught and disclosed therein.

Referring now to FIG. 1, a Computer System 100 contains a Processing Element 102. Processing Element 102 communicates to other elements of the Computer System 100 over a System Bus 104. A Keyboard 106 allows a user to input information into Computer System 100. A Microphone 120 allows the user to input audio commands acted upon by Computer System 100. Microphone 120 may be built into Computer System 100 or be an external microphone connectable to Computer System 100 through Communications Interface 114, such as a handheld microphone or a microphone built into a headset. Speaker 122 allows Computer System 100 to send audio output to the user. Speaker 122 may be built into Computer System 100 or be an external speaker(s).

A Graphics Display 110 allows the Computer System 100 to output information to the user. Graphics Display 110 may be a liquid crystal display, a cathode ray tube display, or any other suitable display. A Pointing Device 108 is also used to input information. Pointing Device 108 may be a mechanical or optical mouse, trackball, joystick, touch pen, light pen, or any other suitable pointing device. A Storage Device 112 is used to store data and programs within the Computer System 100. A Memory 116, also attached to the System Bus 104, contains an Operating System 118, and a relational and spatial database management ("RSDM") software 124 of the present invention, which is loaded into Memory 116 from Storage Device 112.

RSDM Software 124 is designed so that the collection, recording, and display of data can be specifically tailored to an application by the user depending upon the subject task, thereby creating efficiencies in data collection. RSDM Software 124 can simultaneously process inputs from one or more internal or external sensor devices, through System Bus 104 or Communications Interface 114. Communications Interface 114 may contain one or more serial ports, parallel ports, or both. The sensor devices may include, but are not limited to, audio input/output devices, pen/keyboard input, GPS (Global Positioning System), digital cameras, video cameras, laser range finders, bar code readers, RF scanners, and other RS232 or serial devices.

The inputs from the sensor devices are recorded in a database, stored on Storage Device 112, and may be displayed on Graphics Display 110 in a forms format that is easy for a user to manipulate and update as well as a map format, or both at the same time through splitting the display screen. As data is updated, RSDM Software 124 processes the data for the particular application as determined by the user to further validate or manage the data. The preferably Graphical User Interface based RSDM Software 124 allows the user to create a visual presentation of the forms, associate the form fields with the appropriate database table fields, specify spoken words through speech recognition for field names and values, and define how the data inputs are processed.

RSDM Software 124 works particularly well with a voice recognition component. Utilizing voice recognition technology, the user's speech input directs RSDM Software 124 to carry out spoken requests or commands, and provides feedback to the user based on the request/command or the next step in data processing. Sensor data is acquired by Computer System 100 in several ways and can be configured to user defined actions, such as a spoken phrase, or a device button press.

A user can employ the method and system of the present invention with certain sensors, such as those listed above, and a portable Computer System 100 on the street to perform a street sign inventory. As the user travels a route through an area, and arrives at a sign, the user identifies the sign type and certain user-predetermined attributes required for the survey through spoken statements. If necessary, the user may add a new bar code to the sign, and enter that data into the system using a bar code reader. Computer system 100, via Communications Interface 114, reads the code data and enters it into the user-defined field of the relational and/or spatial database. RSDM Software 124, obtaining the user's location using a GPS receiver, may perform a spatial query on the relational and/or spatial database to determine whether the sign is new or already exists in the relational and/or spatial database. An existing record is updated, and for a new sign a new record is created. Similarly a person could use the method and system of the present invention utilizing voice recognition and a bar code reader to perform an inventory count in a warehouse. One skilled in the art will recognize that the applications for the present invention are quite numerous.

Figure 2:
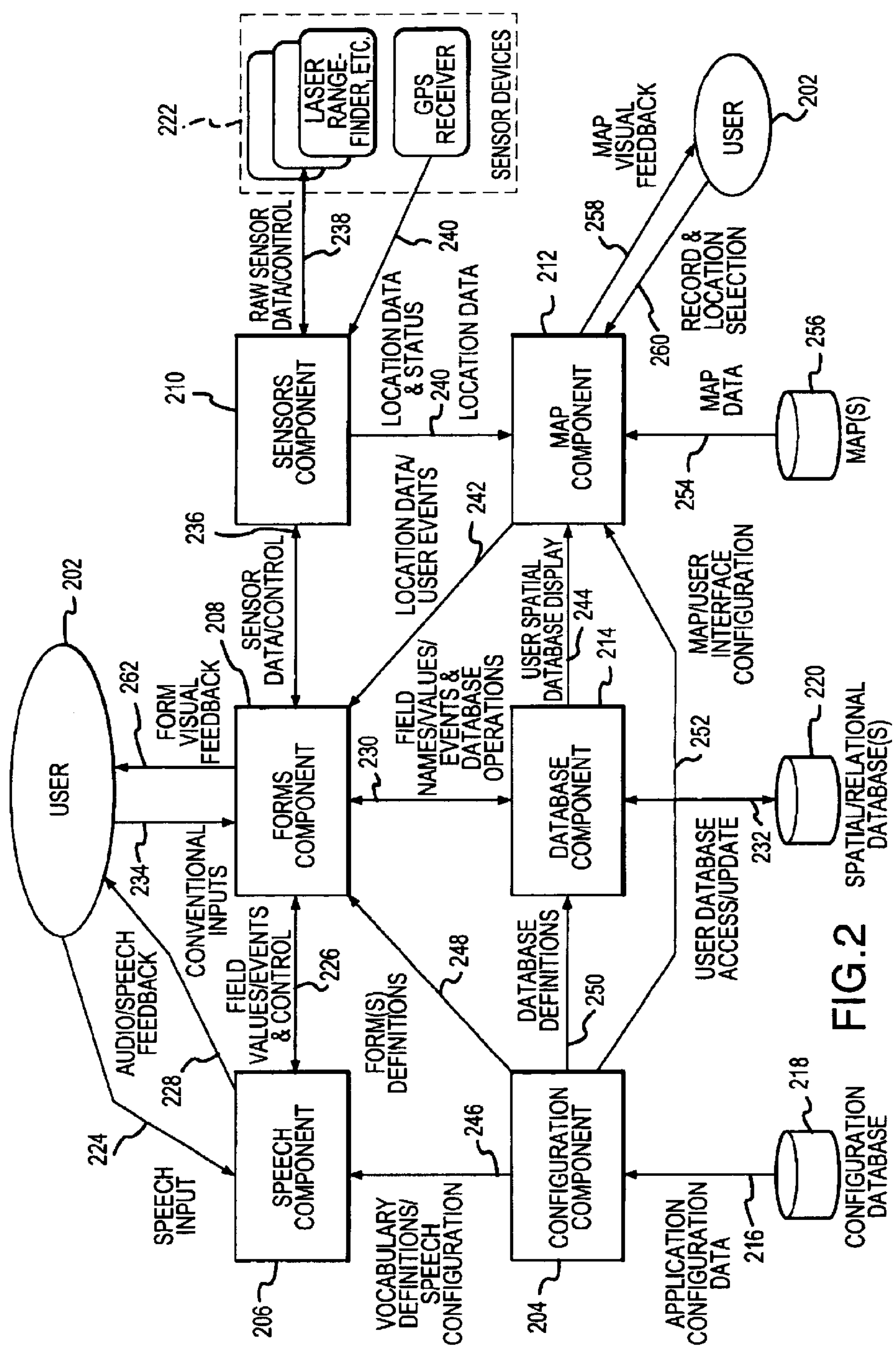
FIG. 2 shows a top level block diagram of the major components of an embodiment of the present invention.

FIG. 2 shows a top level block diagram of the major components of an embodiment of the present invention. Referring now to FIG. 2, Configuration Component 204, Speech Component 206, Forms Component 208, Sensors Component 210, Map Component 212, and Database Component 214 comprise a configurable and programmable application framework with which a User 202 can construct a wide range of applications. For reasons of drawing clarity, User 202 is shown in two locations in FIG. 1, but both locations represent the same User 202.

The components configure themselves through Configuration Component 204, which draws Application Configuration Data 216 from the Configuration Database 218 stored in Storage Device 112 (FIG. 1). Each application created for the application framework is embodied in, and defined by, its own unique Application Configuration Data 216. Configuration Component 204 can manage Application Configuration Data 216 for any number of different applications, and provide a specific application's Application Configuration Data 216 to the other components as selected by User 202. Configuration Component 204 provides Vocabulary Definitions/Speech Configuration 246 to Speech Component 206, Form(s) Definitions 248 to Forms Component 208, Database Definitions 250 to Database Component 214, and Map/User Interface Configuration 252 to Map Component 212.

Speech Component 206 translates Speech Input 224 from User 202 into commands or data, then takes the appropriate action to perform the specified command, or send the data, represented by Field Values/Events and Control 226 to Forms Component 208 which updates the desired field. To this end, Speech Component 206 acquires Speech Input 224 via a standard audio input device, such as Microphone 120 (FIG. 1), and performs speech recognition on it. If a valid statement is recognized, it is analyzed to determine whether it is a command to be performed, or a new data value to be entered into a field on a form.

Commands such as form, field, and database navigation are forwarded to Forms Component 208 for execution. Other commands may be executed by Speech Component 206 itself.

By means of events from Forms Component 208, represented by Field Values/Events and Control 226, Speech Component 206 has knowledge of which input field on which form currently is accepting input (i.e., 'has focus'). This information allows Speech Component 206 to issue an informative spoken message, represented by Audio/Speech Feedback 228, to User 202, and to select the grammar specified for this input field, thus restricting the allowable input values to those defined for that field by User 202. When a valid input value is recognized for this field, the value is forwarded to Forms Component 208, which updates both the displayed value on the form, and the corresponding field in a Spatial/Relational Database(s) 220 associated with Application Configuration Data 216. Field/Names/Values/Events and Database Operations 230 are passed between Forms Component 208 and Database Component 214, and User Database Access/Update 232 is passed between Database Component 214 and Spatial/Relational Database(s) 220. Optionally, User 202 may also interact with a form and its fields, including data entry, through conventional input devices, such as Keyboard 106 or Pointing Device 108 (FIG. 1), represented by Conventional Inputs 234.

Speech Component 206 employs speech synthesis to provide Audio/Speech Feedback 228 to User 202. User 202 may tailor Audio/Speech Feedback 228, in terms of content, for various pre-defined conditions. Through the scripting languages supported by Forms Component 208 used to implement the 'business logic' for the application, arbitrary spoken messages may be programmed.

Forms Component 208 displays and manages the form(s) that User 202 has defined for each application, represented by Form Visual Feedback 262, on Graphics Display 110 (FIG. 1). Form(s) Definitions 248 for these forms are part of each Application Configuration Data 216. Forms Component 208 creates the visual forms from these definitions dynamically, and binds the visual fields to Spatial/Relational Database(s) 220 by utilizing Database Component 214. Database Component 214 handles the association of logical field names used by Forms Component 208 to physical database, table, and field name. It can manage many concurrent connections to any combination of spatial and non-spatial relational databases.

User 202 defines the business rules or logic that can be implemented in one of several standard, interpreted languages (e.g., VBScript, Jscript, ePerl, Python, etc.). Forms Component 208 exposes a rich object model to the script, allowing easy access to the form data, database record manipulation, user-defined spoken messages and dialogs, etc. Many events are provided to the script which enable User 202 to define actions to be taken upon the change in value of a field, or change of focus, among others.

Forms Component 208 also provides an alternative means to implement custom business rules. User 202 may define a sequence of interactions with one or more external components, such as Sensor Devices 222, optionally passing data from the form, represented by Sensor Data/Control and Status Requests 236, or user defined data. A unique sequence can be defined to occur on the change of each field's value. Sensor Devices 222 are also able to access and manipulate the forms and fields through the rich control interface of Forms Component 208.

Sensors Component 210 can be integrated using either the embedded script approach, or the external component technique. Either way, sensor data, represented by Raw Sensor Data/Control 238 and Location Data and Status 240, may be acquired automatically when a certain user-defined statement is recognized, or by pressing a button on the form. The sensor data may be further processed by the script to, for example, apply the vector offset from a laser range-finder to the current location of User 202 to compute the location of a feature. Sensors Component 210 features a number of predefined sensor objects for popular laser range-finders, bar code scanners, RF scanners, distance measuring devices, etc.

These predefined sensor objects handle all details with respect to controlling the sensor and converting the raw sensor data into useful results. Sensors Component 210 also provides a generic sensor object which can be instructed how to process a wide variety of sensor message formats, or simply pass the raw sensor data directly.

External components may also stimulate actions within the business logic by issuing 'events' to Forms Component 208. Both the events and the associated actions are user-definable. Map Component 212 can utilize this capability to notify Forms Component 208 via Location Data/User Events 254 that User 202 has 'picked a point' on the map or that a change in the current location of User 202 has been detected when using the Location (GPS) sensor of Sensor Devices 222. Location Data 240 from Sensor Devices 222 is passed to Sensors Component 210 and forwarded to Map Component 212. Map Component 212 receives Map Data 254 from Map(s) 256 stored on Storage Device 112. Location Data/User Events 242 are passed from Map Component 212 to Forms Component 208. The business rules can then determine what the appropriate action should be.

Map Component 212 displays via Map Visual Feedback 258 any collateral maps and/or layers on Graphics Display 110 (FIG. 1) that User 202 requires for his application, in addition to his spatial database. When used with a GPS receiver within Sensor Devices 222 connected to Sensors Component 210, Map Component 212 can obtain and display on Graphics Display 110 User 202 locations on the map, and pan the map as User 202 moves. Standard tools provided to User 202 include zoom and pan, record inspection and selection, and legend support, represented by Record and Location Selection 260. Notifications from Database Component 214, represented by User Spatial Database Display 244, keep Graphics Display; 110 synchronized with the spatial database at all times. The current record and record sets resulting from spatial queries are highlighted with user-definable colors.

Figure 3:
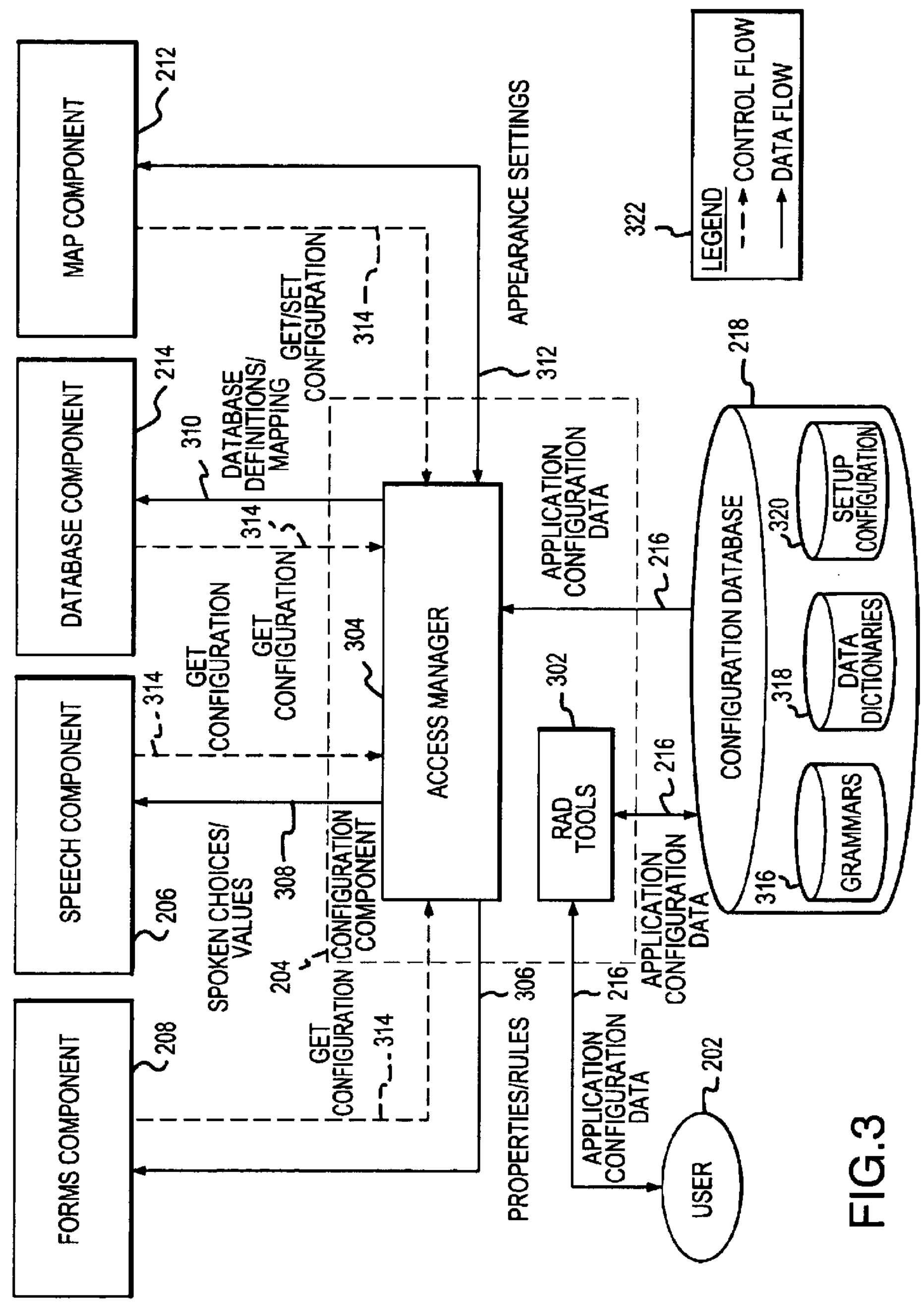
FIG. 3 shows a block diagram of an embodiment of the configuration component of the present invention.

FIG. 3 shows a block diagram of an embodiment of the configuration component of the present invention. Referring now to FIG. 3, Legend 322 defines control flow arrows as dashed-lined and data flow arrows as solid-lined. Configuration Component 204 is used by each of the other components in the application framework to request the Application Configuration Data 216 for the particular component, represented by Get Configuration 314. Each component of the framework provides a generic functionality that is essentially programmable via the Configuration Database 218, from which a user can construct any number of different applications specific to his or her needs. Configuration Database 218 contains Grammars 316, Data Dictionaries 318, and Setup Configuration 320 from which Application Configuration Data 216 is constructed. The framework is also scalable, allowing a user to construct a simple one form, one database table application to a multi-form, multi-database (spatial and/or relational), multi-table system.

Configuration Component 204 manages the Application Configuration Data 216 for each application as well as for any number of different applications. Application Configuration Data 216 completely defines what an application is and how it functions.

A set of Rapid Application Development (RAD) Tools 302 allow User 202 to quickly and easily define the parameters and logical rules for each application. RAD Tools 302 manage the creation and update of Application Configuration Data 216. With RAD Tools 302, User 202 can create the visual presentation of the forms, as well as select acceptable data entry values for the forms, the spoken values used to address specific forms in the application, and specific fields on the forms. These values are used to create the speech vocabulary that defines how and what a user says to manipulate the forms. RAD Tools 302 also manage the logic defined by User 202 that can be implemented in one of several possible standard interpreted languages (e.g., VBScript, Jscript, Perl, Python, etc.).

Forms Component 208 retrieves from Access Manager 304 the Form Properties and Form Field Properties along with their logical names and the Processing Rules to apply, represented by Properties/Rules 306. The properties are used to define the allowable values for a field on a form, and the logical names that Speech Component 206 uses to address forms and fields on the form. The processing/rules are attached to events that occur during form processing, and ultimately define how User 202 interacts with the forms as an application system.

Speech Component 206 retrieves the spoken choice values, the field activation spoken values used to address the fields on a form, and the spoken values used to address a form, represented by Spoken Choices/Values 308. These values are compiled into a vocabulary that User 202 will use to speak to the form. It also retrieves the logical names it will use to address forms and fields on the form.

Database Component 214 retrieves the database table/field definition, and the mapping of the logical fields known by Forms Component 208 to the physical database table and fields, represented by Database Definitions/Mapping 310. These definitions and mappings are used to translate Forms Component 208 commands into commands used to update the appropriate physical databases.

Map Component 212 retrieves the settings used to configure its appearance and functionality, represented by Appearance Settings 312. Appearance Settings 312 include the initial or default map extent, and additional map layers that may be loaded that are not connected directly to a form. Map Component 212 also retrieves point selection event names used when generating notification events that are sent to Forms Component 208 and/or external components, such as Sensor Devices 222. Information regarding the buttons visible and legend attributes for display on Graphics Display 110 (FIG. 1) are also retrieved.

Figure 4:
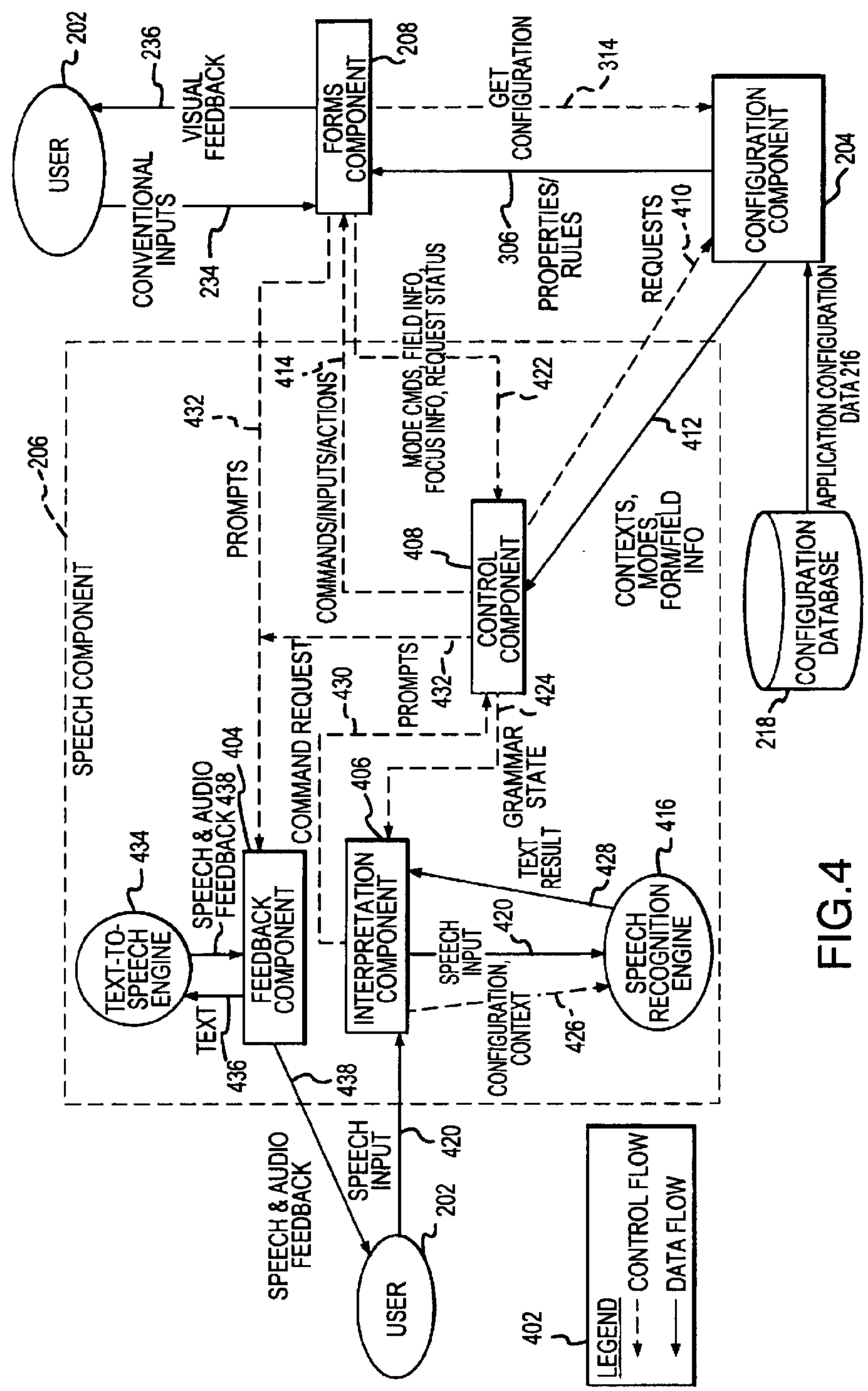
FIG. 4 shows a block diagram of an embodiment of the speech component of the present invention.

FIG. 4 shows a block diagram of an embodiment of the speech component of the present invention. Referring now to FIG. 4, Legend 402 defines control flow arrows as dashed-lined and data flow arrows as solid-lined. Speech Component 206 is responsible for managing the audio interface with User 202. For reasons of drawing clarity, User 202 is shown in two locations in FIG. 4, but both locations represent the same User 202. Speech inputs from User 202 is interpreted, validated, and processed resulting in data updates to the forms, commands to change focus, and record changes or mode changes. Any audio feedback to User 202 is also managed by Speech Component 206. Audio feedback includes telling User 202 what was heard, what happened when processing the request, or prompting for the next field input. Speech Component 206 only interacts with Forms Component 208 and Configuration Component 204. There are three key functional sub-components that handle speech processing: Feedback Component 404, Interpretation Component 406, and Control Component 408.

Control Component 408 is the overall processing control element for Speech Component 206. Control Component 408 requests the configuration/setup data from Configuration Component 204 represented by Requests 410. The information returned, represented by Contexts, Modes, Form/Field Info 412, includes which grammars are going to be used, which forms are needed, the relationships between grammar contexts and form fields and controls, and what modes of user interaction are to be configured (e.g., which Speech Recognition Engine (SRE) 416 to use, or whether to allow only data input to the field with focus or allow input to all fields concurrently). Control Component 408 then commands Forms Component 208 to instantiate the forms and initialize their state, represented by Commands/Inputs/Actions 414.

As Forms Component 208 processes data input from User 202 through Keyboard 106, Graphics Display 110, or Pointing Device 108, represented by Conventional Inputs 234, or from User 202 through Microphone 120, represented by Speech Input 420 that is processed by Speech Component 206, Forms Component 208 updates the state information of the forms and notifies Control Component 408 of changes to the focus or field values, represented by Mode Commands, Field Info, Focus Info, Request Status 422. Control Component 408 then configures the Interpretation Component 406 with the current grammar context, represented by Grammar State 424. This grammar context information enables Interpretation Component 406 to configure SRE 406, represented by Configuration, Context 426, to maximize recognition accuracy and interpret the results that are returned from SRE 406, represented by Text Result 428, after Speech Input 420 is received from User 202.

After Interpretation Component 406 has validated that Text Result 428 is correct and complete, Interpretation Component 406 analyzes Text Result 428 to determine the type of action to take. For example, the action to be taken might be a simple field input, a form navigation request (next field), or a button push request. Control Component 408 processes the command request from Interpretation Component 406, represented by Command Request 430, and updates it's internal state information needed to manage the processing. Control Component 408 then forwards the appropriate Commands/Inputs/Actions 414 requests to Forms Component 208, such as requesting that a button be pushed, move to a specific field, or commit the record changes. Control Component 408 can also send configuration information to Interpretation Component 406. For example, if User 202 requests to allow any field to be updated, then the grammar context must be changed via Grammar State 424. Control Component 408 determines the feedback needed and makes the request, represented by Prompts 432, to Feedback Component 404.

Feedback Component 404 configures the Text-To-Speech Engine (TTSE) 434 as requested to be in the correct mode, such as synthetic voice, or accesses prerecorded audio files that may be used for feedback. Feedback Component 404 receives Prompts 432 from Control Component 408 or Forms Component 208 and formats and forwards the requests to TTSE 434, represented by Text 436. Feedback Component 404 determines when it is appropriate to start the feedback, represented by Speech and Audio Feedback 438, based on the state of the interaction with User 202, and then controls TTSE 434 playback of prerecorded audio and/or synthetic speech to User 202. Speech Component 206 is capable of using and configuring a variety of commercially available types of SRE 416 and TTSE 434.

Figure 5:
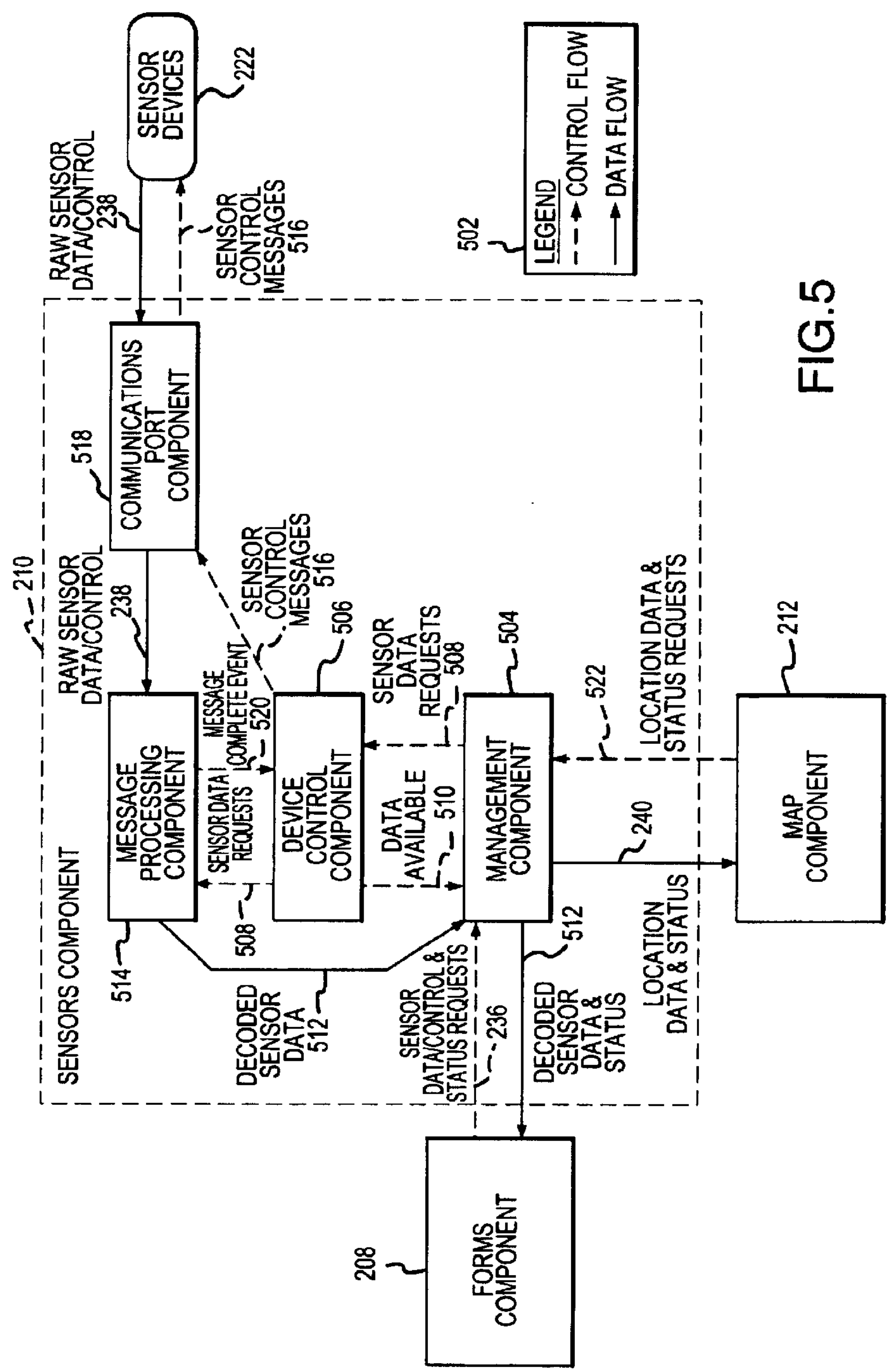
FIG. 5 shows a block diagram of an embodiment of the sensors component of the present invention.

FIG. 5 shows a block diagram of an embodiment of the sensors component of the present invention. Referring now to FIG. 5, Legend 502 defines control flow arrows as dashed-lined and data flow arrows as solid-lined. Sensors Component 210 comprises a set of polymorphic sensor objects, each of which is designed to interface with and decode data from a given model of sensor device. Each sensor object has the structure shown in FIG. 5. Many sensor models are supported, including but not limited to laser range-finders, bar code scanners, distance measuring instruments, GPS receivers, etc. Sensors Component 210 can support sensors which operate either synchronously (i.e., must be polled for data) or asynchronously (i.e., provide data automatically whenever it is acquired by the sensor). In addition, the interface with Forms Component 208 may be operated either synchronously or asynchronously independently of the mode of the sensor device.

The external interface of Sensors Component 210 with Forms Component 208 (or to any other client of Sensors Component 210) is provided by Management Component 504. Management Component 504 routes or generates sensor control messages and data requests, represented by Sensor Data/Control and Status Requests 236 and Sensor Data Requests 508, to the Device Control Component 506, and receives notification from Device Control Component 506 when new sensor data has been received, represented by Data Available 510. Overall status for Sensors Component 210 is maintained by Management Component 504, and provided to Forms Component 208 via Decoded Sensor Data and Status 512 upon receiving Sensor Data/Control and Status Requests 236. When new Raw Sensor Data/Control 238 has been decoded into Decoded Sensor Data and Status 512 by Message Processing Component 514 and is requested by Forms Component 208, Management Component 504 facilitates the transfer of the data.

The Device Control Component 506 also performs sensor specific configuration of Communications Port Component 518 for the class of sensor it controls, represented by Sensor Control Messages 516. Sensor device specific message protocols are handled by the Device Control Component 506. Raw Sensor Data/Control 238 received from Sensor Devices 222 is forwarded by Communications Port Component 518 to Message Processing Component 514, which contains the specific algorithms for converting the raw data into a useful format. Message Processing Component 514 may also perform certain unit conversions such that the decoded data is provided with the units specified by Forms Component 208 (e.g., conversion of the distance units from the sensor to feet regardless of the original units). Message Complete Event 520 and Sensor Data Requests 508 are passed between Message Processing Component 514 and Device Control Component 506.

Sensors Component 210, when attached to a GPS receiver, may also provide GPS Location Data, represented by Location Data And Status 240 and Location Data and Status Requests 522, to Map Component 212 to support the display of the current location of User 202 on a map displayed on Graphics Display 110.

Figure 6:
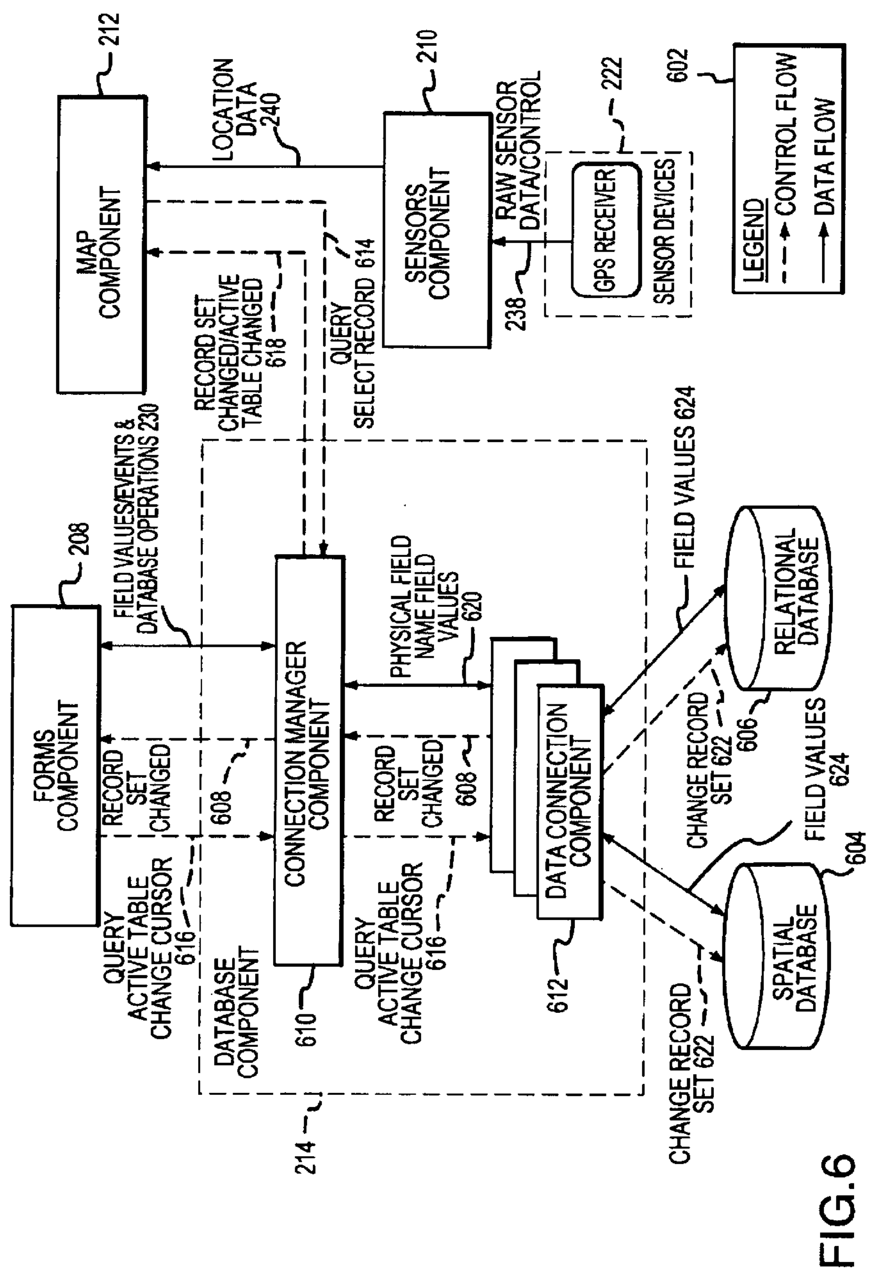
FIG. 6 shows a block diagram of an embodiment of the database component of the present invention.

FIG. 6 shows a block diagram of an embodiment of the database component of the present invention. Referring now to FIG. 6, Legend 602 defines control flow arrows as dashed-lined and data flow arrows as solid-lined. Database Component 214 maps logical field names used by Forms Component 208 to physical database, table, and field names. It can manage many concurrent connections to any combination of one or more spatial database 604 and non-spatial relational database 606. Database Component 214 also manages the synchronization of Map Component 212 and Forms Component 208, in that when a command from Map Component 212, such as Query Select Record 614, affects Forms Component 208, Forms Component 208 is notified. When a forms component command, such as Query Activate Table Change Cursor 616 affects Map Component 212, Map Component 212 is notified via Record Set Changed/Active Table Changed 618.

Database Component 214 presents a common interface for a wide-range of both spatial databases 604 and relational databases 606. Forms Component 208 commands Database Component 214 using logical field names, which makes it possible to change the physical database that a form is connected to with only a minor configuration change. Commands accepted include record set-oriented commands, represented by Query Activate Table Change Cursor 616, such as changing the cursor location within the current record set (e.g., Next Record and Previous Record), adding and deleting records from the record set, as well as field-level commands to get and set the current value of a field from the current record.

Connection Manager Component 610 uses the logical field name from Field/Names/Values/Events and Database Operations 230 to determine the appropriate Data Connection Component 612 to handle the command request, and the particular physical field name for field-oriented commands, represented by Physical Field Name/Field Values 620. Data Connection Component 612 in turn handles the specific interface to the underlying physical database via Change Record Set 622 and exchanging Field Values 624 back and forth between Data Connection Component 612 and spatial database 604 and relational database 606. When a request is complete that affects the record set, a notification event is sent back through the Connection Manager to Forms Component 208 via Record Set Changed 608. This event is propagated to Forms Component 208, and to Map Component 212, if it is affected by the record set change.

Map Component 212 is the visual representation of Spatial Database 604, allowing User 202 to interact spatially with it. Map Component 212 accepts Location Data 240 from Sensors Component 210, allowing User 202 to visually travel through his spatial data. Map Component 212 can command Database Component 214 to select a particular record as the active record, and to spatially select a record set. These commands in turn generate notification events to Forms Component 208 that Record Set Changed 608 has occurred.

Figure 7:
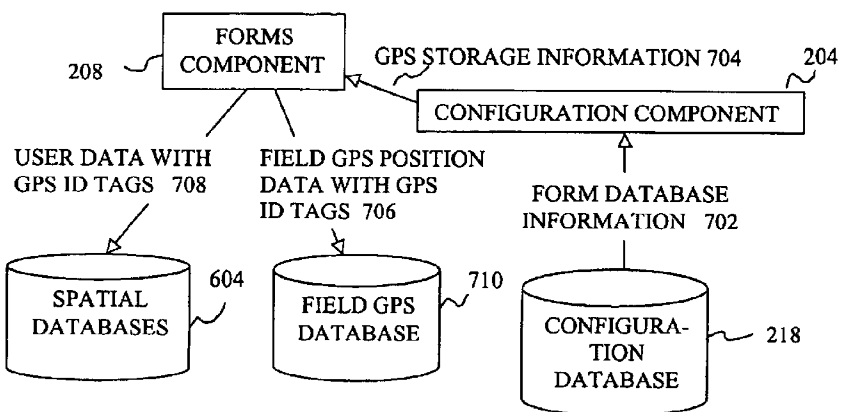
FIG. 7 shows an embodiment of the spatial data collection component during field processing of the present invention.

FIG. 7 shows an embodiment of the spatial data collection component during field processing of the present invention. Referring now to FIG. 7, field processing is where User 202 utilizes Computer System 100 out in a field location to gather data in conjunction with a particular application, such as a street sign inventory or a road condition assessment. Configuration Component 204 retrieves Form Database Information 702 for the particular application from Configuration Database 218. Forms Component 208 uses GPS Storage Information 704 derived from Configuration Component 204 to generate user data and GPS position data. The Field GPS Position Data with GPS ID Tags 706 is stored in Storage Device 112 in a Field GPS Database 710. The User Data with GPS ID Tags 708 is stored in Storage Device 112 in a Spatial Database 604. The GPS ID Tags enable the correlation of the Post Processed GPS Data 804 (FIG. 8) with the GPS dependant spatial data.

Figure 8:
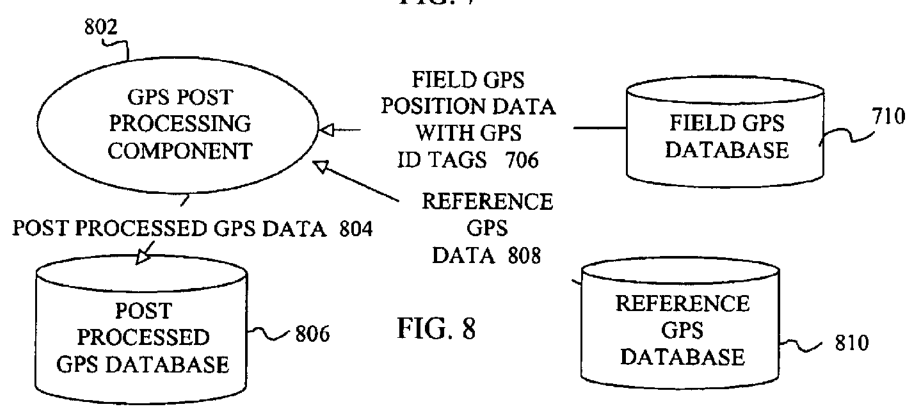
FIG. 8 shows an embodiment of GPS post processing of the present invention.

FIG. 8 shows an embodiment of GPS post processing of the present invention. Referring now to FIG. 8, GPS Post Processing corrects GPS data collected in the field with Reference GPS:Data. GPS Post Processing may be done on a central computer after the data collected in the field by Computer System 100 has been downloaded to the central computer. Or, GPS Post Processing may be done within Computer System 100. For the purposes of FIG. 8, GPS Post Processing is done within Computer System 100.

GPS Post Processing Component 802, which may be a third party product, generates corrected GPS Data with GPS ID Tags, represented by Post Processed GPS Data 804, which is stored in Storage Device 112 in a Post Processed GPS Database 806. This is accomplished by matching Reference GPS Data 808 stored in Storage Device 112 in a Reference GPS Database 810 with Field GPS Position Data with GPS ID Tags 706 stored in Storage Device 112 in Field GPS Database 710, and determining correction information.

Figure 9:
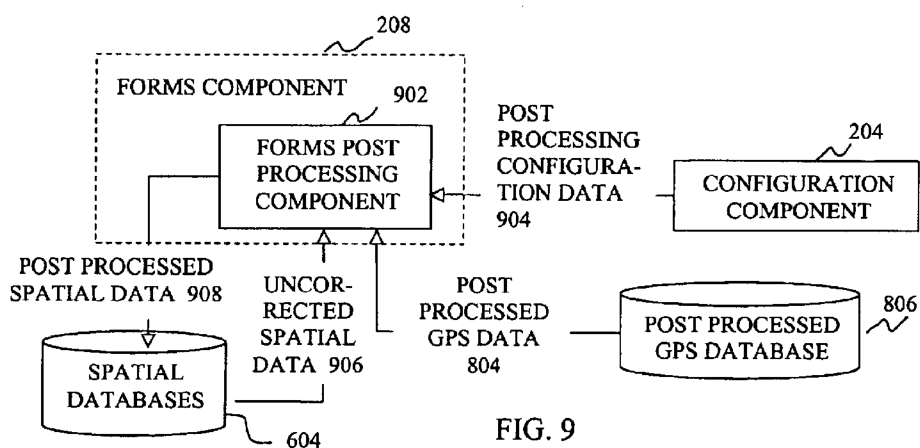
FIG. 9 shows an embodiment of spatial data post processing of the present invention.

FIG. 9 shows an embodiment of spatial data post processing of the present invention. Referring now to FIG. 9, as a part of Forms Component 208, Forms Post Processing Component 902 replaces uncorrected spatial data with corrected spatial data. This is done by matching the uncorrected spatial data's GPS ID Tag, represented by Uncorrected Spatial Data 906 retrieved from spatial database 604, with the Post Processed GPS Data 804 with corrected GPS ID Tag's retrieved from Storage Device 112. Post Processing Configuration Data 904 from Configuration Component 204 defines which database fields contain spatial information and the process by which the information is to be corrected (e.g., replacement by corrected values, or re-computation using original values and corrected values). The corrected GPS data is obtained by searching for the GPS ID Tag associated with the uncorrected spatial data. Post Processed Spatial Data 908 is returned to Spatial Database 604.

Forms Post Processing Component 902 updates GPS field collected data with the higher accuracy of GPS Post Processed. Data. The invention may be used with an uncorrected or a real time differentially corrected GPS sensor in the field. The dependant GPS spatial user data generated is of a greater refined accuracy than field collected GPS data. Additionally, all field location calculations are re-calculated using the refined accuracy of the post processed data.

Figure 10:
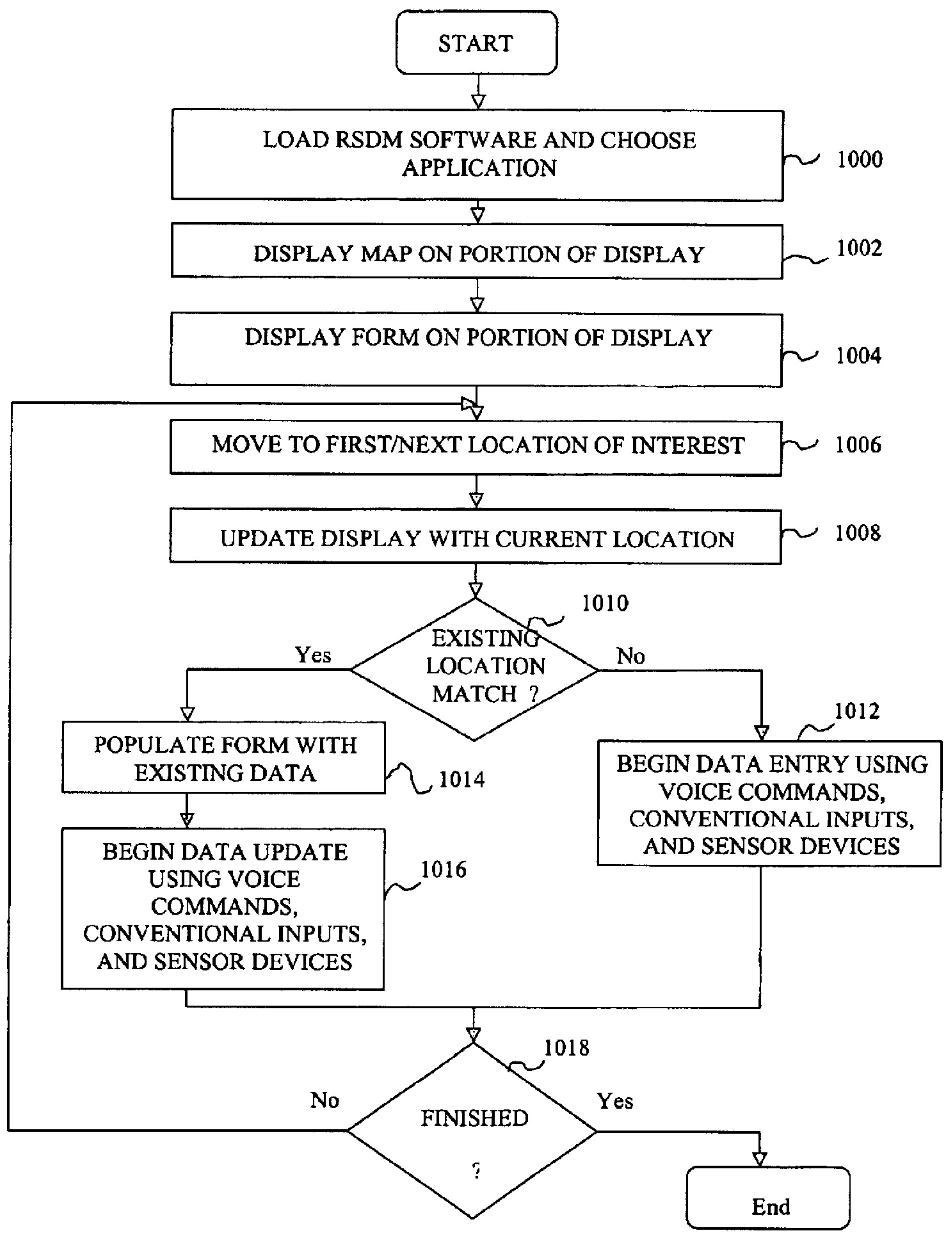
FIG. 10 shows an embodiment of the relational and spatial database management method of the present invention.

FIG. 10 shows an embodiment of the relational and spatial database management method of the present invention where some or all of the following steps may be performed:

In step 1000 RSDM Software 124 is loaded into Memory 116 of Computer System 100 and User 202 chooses which of one or more applications is to be used. The application may be a street sign inventory application, road condition assessment application, etc. In step 1002 a map representing the current location of User 202 is displayed on a portion of Graphics Display 110. An initial form associated with the chosen application is displayed on another portion of Graphics Display 110 in step 1004. Typically, Graphics Display 110 is split into left and right portions of approximately equal width, but the portion of the screen devoted to the map and the portion of the screen devoted to the form can be varied depending upon the particular application.

In step 1006 User 202 then moves to the first location of interest, if User 202 is not already at the first location of interest. If the application is a street sign inventory, User 202 would move to the first traffic sign along the route desired to be inventoried. User 202 may be on foot, on a bicycle, or motor vehicle, or any other appropriate mode of transportation.

In step 1008, a GPS receiver in communication with Computer System 100 provides location data, which is processed by Map Component 212. The map shown on Graphics Display 110 is updated with the current location of User 202. Step 1010 determines if there is an existing database record corresponding to this first location. For example, User 202 may be at a stop sign. RSDM Software 124 determines if there is a database record matching the location of this stop sign. If there is, then in step 1014 the initial form for this application is displayed in Graphics Display 110 and populated with the data for this record, with each field in the form that has stored data being displayed. Not all fields may have any data in the existing record, and thus the field will remain blank.

In step 1016 User 202 may begin updating the existing record in a variety of ways. User 202 may use audible voice commands that are received in Microphone 120 and processed by Speech Component 206. User 202 may also use any of the Conventional Inputs, 234, such as Keyboard 106, a touch pen or touch screen on Graphics Display 110, or Pointing Device 108. Additionally, one or more Sensor Devices 222 may be used to provide Raw Sensor Data/Control 238, either manually or automatically. For example, User 202 may apply a bar code strip to the stop sign, and then use a bar code reader to input the bar code data into Sensors Component 210. A GPS receiver may automatically provide location data to be stored and compared to the current location data. Any discrepancies between the old and current location data may be handled according to the GPS Post Processing system of FIG. 8 and the Spatial Data Post Processing system of FIG. 9.

If step 1010 determines that there is not an existing database record corresponding to this first location, then in step 1012 User 202 may begin inputting data into the form displayed in Graphics Display 110 according to the ways described in step 1016. User 202 determines if the current data collection task is finished. If not, then User 202 moves to the next location of interest, and control returns to step 1006. One skilled in the art will recognize that User 202 may be in continuous motion while performing the above steps. For example, as User 202 approaches a location having an existing record, the form will be populated with the existing data when User 202 is within a predetermined distance from the location, such as a perimeter of 10 feet, 100 feet, or any other suitable distance depending upon the application.

If User 202 determines that the current data collection task is finished in step 1018, then the method of the present invention ends.

Figure 11:
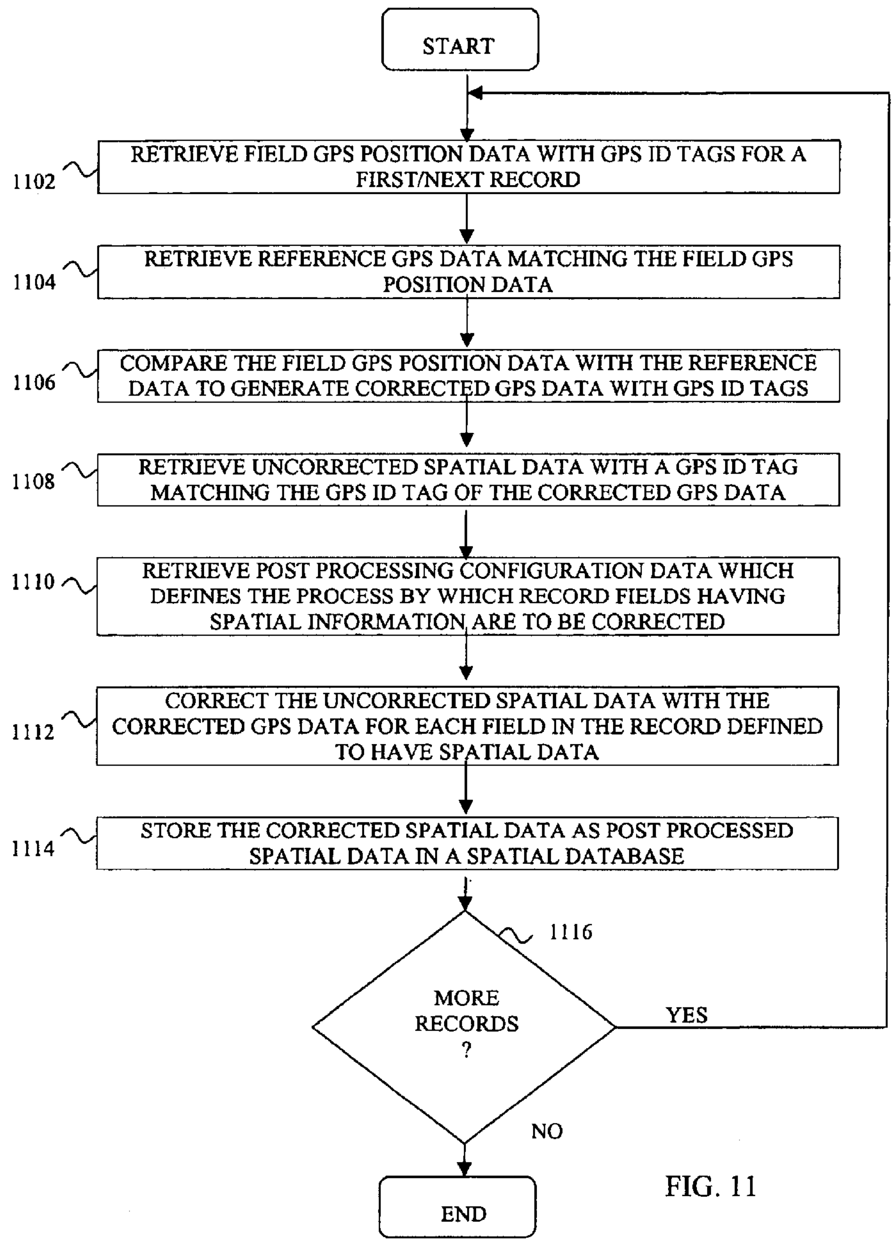
FIG. 11 shows an embodiment of the GPS Post Processing system and the Spatial Data Post Processing method of the present invention.

FIG. 11 shows an embodiment of the GPS Post Processing method and the Spatial Data Post Processing method of the present invention. GPS Post Processing and Spatial Data Post Processing may be done on a central computer after the data collected in the field by Computer System 100 has been downloaded to the central computer. Alternatively, GPS Post Processing and Spatial Data Post Processing may be done within Computer System 100. For the purposes of FIG. 11, GPS Post Processing and Spatial Data Post Processing is done within Computer System 100 where some or all of the following steps may be performed:

In step 1102 Field GPS Position Data with GPS ID Tags 706 for a first record is retrieved from Field GPS Database 710, which is stored in Storage Device 112. In step 1104 Reference GPS Data 808 matching Field GPS Position Data with GPS ID Tags 706 is retrieved from Reference GPS Database 810, which is also stored in Storage Device 112. Field GPS Position Data with GPS ID Tags 706 is compared to Reference GPS Data 808 in step 1106 to generate corrected GPS position data with GPS ID Tags, referred to as Post Processed GPS Data 804, which may be stored in Post Processed GPS Database 806 or left in Memory 116.

In step 1108 Uncorrected Spatial Data 906 having a GPS ID Tag matching the GPS ID Tag of Post Processed GPS Data 804 is retrieved from Spatial Database 604. Post Processing Configuration Data 904 is retrieved from Configuration Component 204 in step 1110. Post Processing Configuration Data 904 defines the process by which record fields having spatial information are to be corrected. In step 1112 Uncorrected Spatial Data 906 is corrected with Post Processed GPS Data 804 for each field in the record having spatial data. The corrected spatial data, referred to as Post Processed Spatial Data 908 is stored in Spatial Database 604 in step 1114.

Step 1116 determines if there are more records to be processed. If yes, control returns to step 1102 where Field GPS Position Data with GPS ID Tags 706 for the next record is retrieved from Field GPS Database 710. If in step 1116 there are no more records to process, then the method of GPS Post Processing and Spatial Data Post Processing of the present invention ends.

Figure 12:
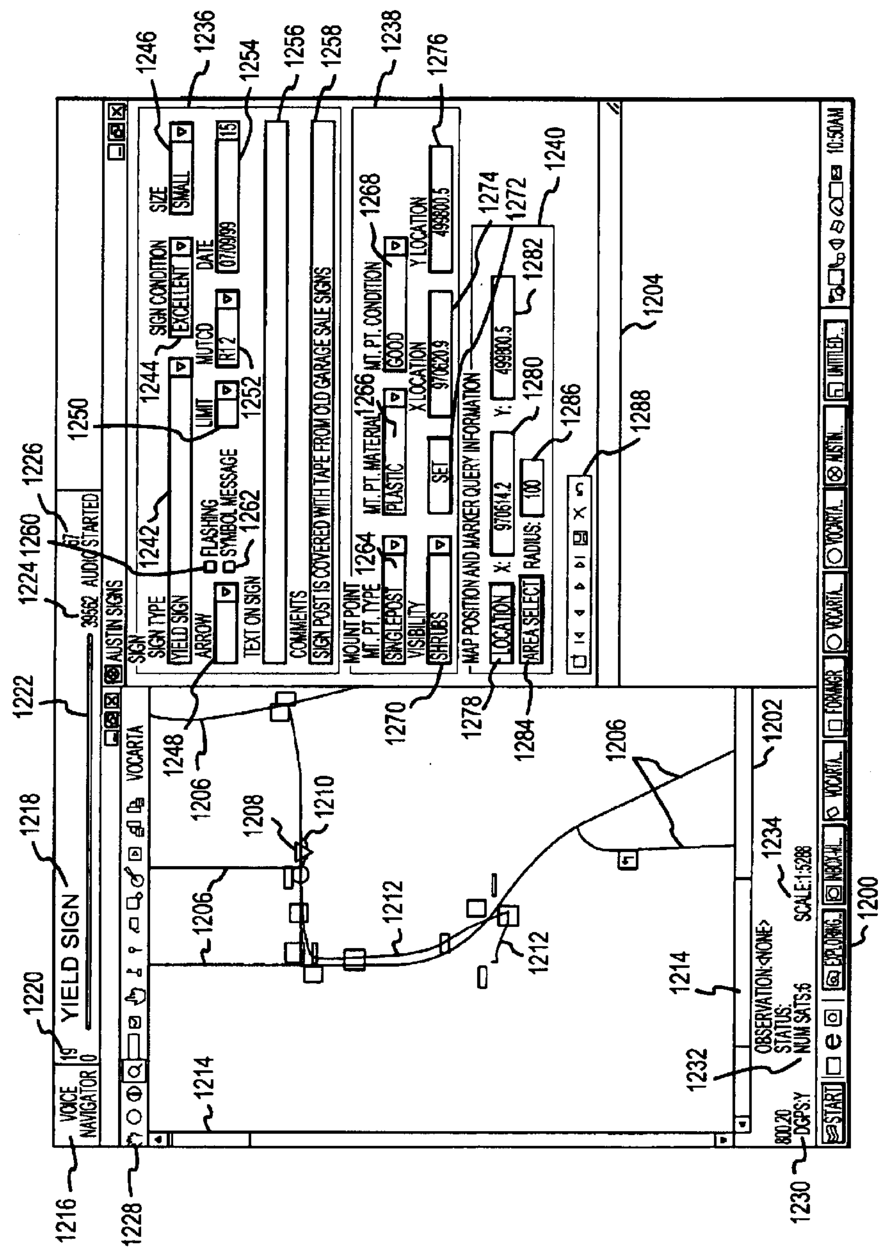
FIG. 12 shows a representation of a screen shot of a sample application in an embodiment of the present invention showing a map and a form displayed on a graphics display corresponding to a location of interest.
Figure 13:
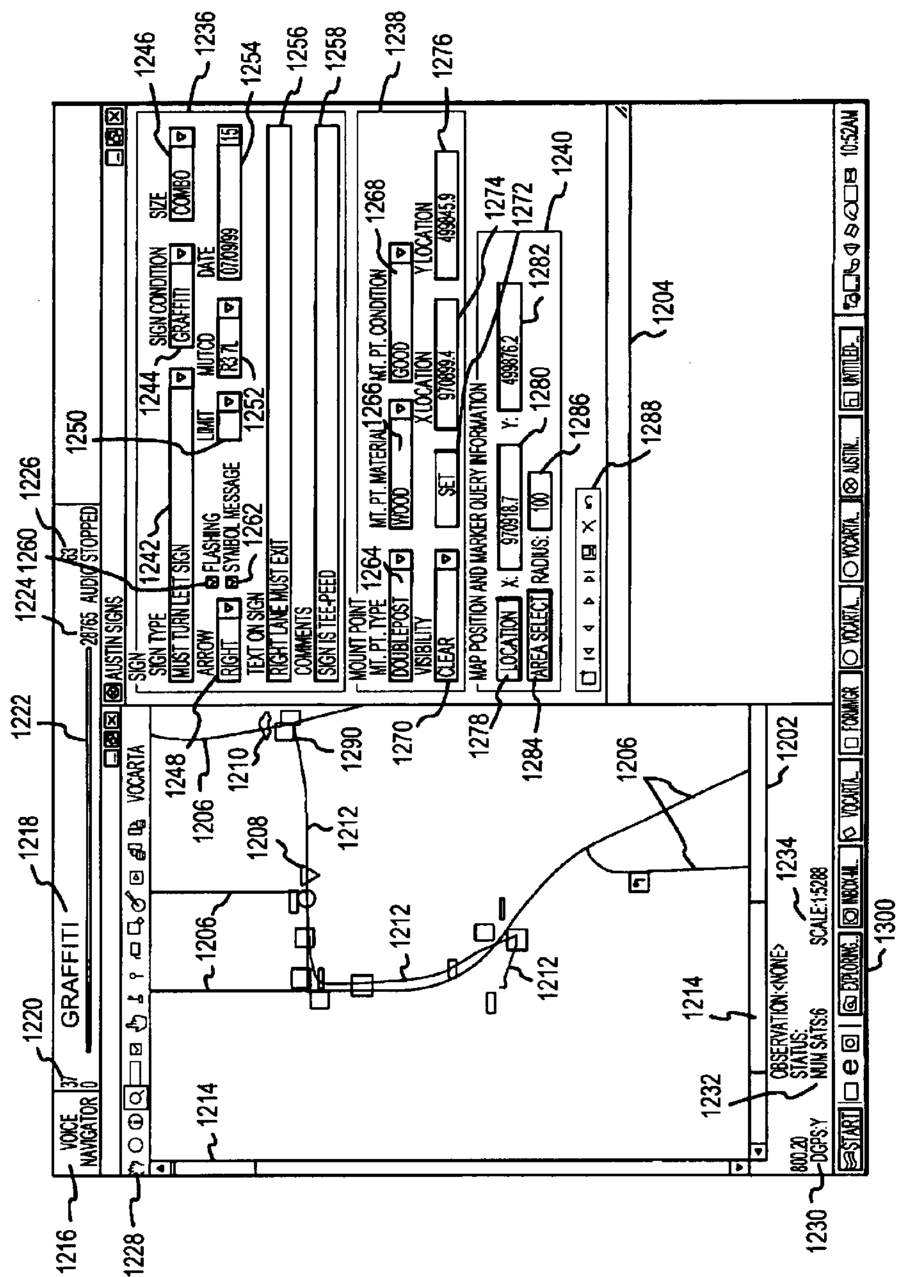
FIG. 13 shows a representation of a screen shot of a sample application in an embodiment of the present invention showing a map and a form displayed on a graphics display corresponding to a next location of interest from the location of interest in FIG. 12.

FIG. 12 shows a representation of a screen shot of a sample application in an embodiment of the present invention showing a map and a form displayed on a graphics display corresponding to a location of interest. Referring now to FIG. 12, Screen Display 1200 is displayed on Graphics Display 110 of Computer System 100 after an application utilizing RSDM Software 124 has been loaded from Memory 116. The application depicted in FIGS. 12 and 13 is a street sign inventory application. One skilled in the art will recognize that there are hundreds of different applications that could utilize the present invention. The street sign inventory application is merely illustrative of these many applications and is not intended to be limiting thereto.

Screen Display 1200 is divided into two major sections: Map Format 1202, which is the visual feedback provided by Map Component 212, and Form Format 1204, which is the visual feedback provided by Forms Component 208. Map Format 1202 can be configured to display various GIS (Geographic Information Services) themes. A street theme and a sign theme are displayed in Map Format 1202 for this street sign inventory application. Streets 1206 are shown, usually in a same color such as blue, and various signs having different shapes, such as Yield Sign 1208 and Must Turn Left Sign 1290. All of the signs depicted in Map Format 1202 represent signs where data about the signs has been previously collected and stored in the database associated with the street sign inventory application. After an initial street sign inventory is taken, reviews may be conducted periodically to verify the status of the existing signs and to capture data on any new signs that have been installed since the last inventory was taken. The signs may be depicted in different shapes and colors depending upon the type or category of sign.

User 202 in this particular application is driving a car to do the street sign inventory and has Computer System 100 on board. User 202 could also walk, ride a bike, etc., to conduct the street sign inventory. A Car Symbol 1210, which is mostly hidden by Yield Sign 1208, indicates the current location of User 202. Traveled Line 1212, usually a different color than Streets 1206 such as gray, shows the path traveled so far by User 202 since the current street sign inventory session began. Scroll Bars 1214 may be manipulated by Pointing Device 108 to shift the focus of the visual information displayed in Map Format 1202.

In this particular instance, User 202 has driven in close enough proximity to a yield sign, represented in Map Format 1202 as Yield Sign 1208, so that Yield Sign 1208 has focus and is highlighted in a focus color, such as purple. This allows User 202 to visually distinguish Yield Sign 1208 as the sign currently having focus from the other signs currently displayed. Also, Car Symbol 1210 is shown in close proximity to Yield Sign 1208, being partially obscured behind Yield Sign 1208.

Another section of Screen Display 1200 is Voice Navigator 1216 which provides feedback to User 202 regarding User 202 speech input. Text Area 1218 displays the last speech recognized and processed by Speech Component 206 and sent to Forms Component 208, which in this instance, was the words "Yield Sign" spoken by User 202. As User 202 approached the yield sign in the car on the street, User 202 spoke the words "Yield Sign" which was picked up by Microphone 120 and processed by Speech Component 206. Speech Component 206 outputs the audio feedback "Yield Sign" to User 202, and Forms Component 208 visually displays "Yield Sign" as well in Text Area 1218.

Observation Count 1220 indicates the current number of speech inputs User 202 has made that have been received and understood by Speech Component 206 in this street sign inventory session, which in this case is 19. Sound Level Bar 1222 and Sound Level Number 1224 provide feedback on the sound level being received. Sound Level Bar 1222 changes color from left to right in response to the sound level being received, and Sound Level Number 1224 gets larger with higher sound levels. A Sound Level Number 1224 below 10,000, or color changes in Sound Level Bar 1222 only in the far left portion of the bar, would indicate to User 202 that Microphone 120 may need to be adjusted or moved closer to User 202's mouth. Score 1226 is a score on the quality level that Speech Component 206 attributes to the confidence in interpreting the speech input of User 202. A Score 1226 of 0 to 35 is considered poor, and the speech input so scored is not accepted. A Score 1226 in the 60's and 70's is considered very good. If Score 1226 remains low, then User 202 may need to speak louder, speak more clearly and succinctly, or speak more slowly, etc., in order to improve Score 1226.

Tool Bar 1228 provides icons that can be manipulated by Pointing Device 108 to alter the display in Map Format 1202 and provide functionality based on the particular application. Functionality includes, automatic pan tool (toggle on or off), information tool, zoom tool, measure tool, query tool, selection tool, annotation tool, retrieve tool, and save tool, etc.

DGPS Indicator 1230 indicates whether DGPS (Differential Global Positioning Service) is turned on or off. Satellite Number 1232 indicates the number of satellites that the GPS Receiver is currently receiving data from. Three satellites are needed at a minimum to determine position in an X-Y plane, and four are needed for three dimensional determination. Scale 1234 indicates the current scale that the map data is being displayed.

Form Format 1204 displays the sign form associated with the street sign inventory application provided by Forms Component 208. There are three major sections to the sign form: Sign Section 1236, Mount Point Section 1238, and Map Position Section 1240. Sign Section 1236 contains fields regarding information about the sign that currently has focus. In this case, Yield Sign 1208 has focus, and the fields displayed in Map Format 1202 are populated with the existing information in Spatial/Relational Database 22.0 for Yield Sign 1208. Many of the fields have pull down menus listing the predetermined categories that are configurable by User 202 for each particular application. Fields within Sign Section 1236 include: Sign Type 1242 (yield sign, stop sign, etc.); Sign Condition 1244 (excellent, good, fair, poor, graffiti, etc.); Size 1246 (small, medium, large, combo, etc.); Arrow 1248 (right, left, up, down, etc.); Limit 1250 (speed limits, such as 35 MPH, 55 MPH, 75 MPH, etc.); MUTCD 1252 (a municipal uniform traffic code description corresponding to federal law, such as R1 2, etc., which is in sync with Sign Type 1242); Date 1254 (the last date that data for this sign was updated); Text on Sign 1256 (the words written on the sign, if any); Comments 1258 (usually observations made by User 202 that there are no other fields for); Check Box 1260 (for indicating that the sign has a flashing light); and Check Box 1262 to indicate that the message on the sign is symbolic rather than containing words.

User 202 may use any of the input methods described previously to enter new or updated data into any of the fields displayed in Form Format 1204, including speech input through Microphone 120, Keyboard 106, and Pointing Device 108. Some fields may be exclusively designed to receive input of a certain type, but do not have to be limited to any one type of user input.

Mount Point Section 1238 contains fields regarding information about the mounting of the sign that currently has focus. Fields within Mount Point Section 1238 include: Mount Point Type 1264 (single post, double post, etc.); Mount Point Material 1266 (plastic, wood, metal, etc.); Mount Point Condition 1268 (excellent, good, fair, poor etc.); Visibility 1270 (shrubs, tree, clear, etc.); X Location 1274 and Y Location 1276 (the GPS position data from the latest update); and Set 1272 (allows User 202 to update the GPS position data based on User 202's current location and currently received GPS position data from a GPS receiver).

Map Position Section 1240 contains fields regarding current GPS receiver data. Fields within Map Position Section 1240 include: Location 1278 (explained below); X Current 1280 and Y Current 1282 (the current GPS position data from the GPS receiver); Radius 1286 (allows User 202 to enter the radius that will be used in the automatic search for objects based upon proximity to User 202); Area Select 1284 (enables the area entered in Radius 1286); and Tool Bar 1288 (allows User 202 to create a new sign record, advance forward or backward through all the sign records, save a sign record, delete a sign record, or undo the changes made to a sign record). Location 1278 is used in conjunction with a feature of Tool Bar 1228. Clicking on a feature in Tool Bar 1228 allows User 202 to mark a location within Map Format 1202 with Pointing Device 108, such as the position of a new street sign. Then, by clicking on Location 1278, the GPS position data corresponding to the marked location appears in X Current 1280 and Y Current 1282.

FIG. 13 shows a representation of a screen shot of a sample application in an embodiment of the present invention showing a map and a form displayed on a graphics display corresponding to a next location of interest from the location of interest in FIG. 12. Referring now to FIG. 13, Screen Display 1300 is displayed on Graphics Display 110 of Computer System 100 after User 202 has traveled to a next location of interest. As User 202 moves away in the car from the yield sign, Yield Sign 1208 loses focus. As User 202 moves within the proximity radius of the next sign having data stored in Spatial/Relational Database 220, which is a must turn left sign, Must Turn Left Sign 1290 gains focus. Car Symbol 1210 is displayed in close proximity to Must Turn Left Sign 1290. An additional portion of Traveled Line 1212, from Yield Sign 1208 to Must Turn Left Sign 1290 is also displayed.

Form Format 1204 is now populated with and displays the existing information in Spatial/Relational Database 220 for Must Turn Left Sign 1290. Text Area 1218 now displays the word "Graffiti", which is the last speech recognized and processed by Speech Component 206 and sent to forms Component 208, which in this instance, was the word "Graffiti" spoken by User 202. As User 202 approached the must turn left sign on the street, User 202 observed the graffiti on the sign and spoke the word "Graffiti" which was picked up by Microphone 120 and processed by Speech Component 206. Speech Component 206 outputs the audio feedback "Graffiti" to User 202, and Forms Component 208 visually displays "Graffiti" as well in Text Area 1218, and Sign Condition 1244 is updated to reflect the condition "graffiti."

Observation Count 1220 indicates the current number of speech inputs User 202 has made that have been received and understood by Speech Component 206 in this data gathering session, which in this case is now 37. The last speech input received a Score 1226 of 63.

If User 202 encounters a new sign not previously inventoried, User 202 can access Tool Bar 1288 to select a "new sign" button and Form Format 1204 will display empty fields which User 202 can audibly enter data in through Speech Component 206, or use any of the other input mechanisms described above.

Having described a presently preferred embodiment of the present invention, it will be understood by those skilled in the art that many changes in construction and circuitry and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A method for relational and spatial database management, the method comprising the acts of:

(a) displaying a map data representing a current geographic area on a first portion of a graphics display of a computer system, wherein said map data is associated with at least one application of a relational and spatial database management software loaded on said computer system;

(b) displaying a first form, associated with said at least one application, on a second portion of said graphics display;

(c) moving a GPS receiver in communication with said computer system to a first geographic location of interest;

(d) updating said map data displayed on said first portion of said graphics display to display a location symbol on said map data corresponding to said first geographic location of interest of said GPS receiver;

(e) searching a relational and spatial database, associated with said at least one application and stored on said computer system, for a database record matching said first geographic location of interest;

(f) if said database record matching said first geographic location of interest is found, populating at least one field, displayed on said second portion of said graphics display within said first form, with a field data from said database record associated with said at least one field;

(g) inputting at least one new field data into a one of said at least one field displayed on said graphics display within said first form, wherein said inputting act is accomplished through a voice input processed by a speech component of said relational and spatial database management software; and (h) outputting by said speech component a spoken message in response to said inputting of said at least one new field data;

(i) moving said GPS receiver, in communication with said computer system, to a second geographic location of interest;

(j) repeating acts (d) through (g) for said second geographic location of interest;

(k) repeating acts (i) through (j) for a next geographic location of interest;

(l) storing said at least one new field data inputted through said voice input for each of said geographic locations of interest in a field database record in a field database along with a field ID tag;

(m) retrieving said at least one new field data with said field ID tag from said field database record stored in said field database for said first geographic location of interest;

(n) retrieving a reference field data having a reference ID tag matching said field ID tag from said relational and spatial database;

(o) generating a corrected field data by comparing said at least one new field data with said reference field data and associating a matching ID tag with said corrected field data;

(p) retrieving an uncorrected field data having an ID tag matching said matching ID tag from said relational and spatial database;

(g) correcting said uncorrected field data with said corrected field data creating a post processed spatial field data; and (r) storing said post processed spatial field data in said relational and spatial database.

2. A method for relational and spatial database management according to claim 1 further comprising the acts of:

(s) repeating acts (m) through (r) for a next said at least one new field data.

3. An apparatus for relational and spatial database management, said apparatus comprising:

a processing element for running a relational and spatial database management software having at least one application;

a GPS receiver in communication with said processing element for determining GPS position data;

a graphics display in communication with said processing element for displaying a map data representing a current geographic area associated with said at least one application in a first portion of said graphics display, and for displaying a location symbol on said map data corresponding to a first location of interest of said GPS receiver, and for displaying a first form associated with said at least one application in a second portion of said graphics display;

a relational and spatial database in communication with said processing element for storing a plurality of spatial and relational database records associated with said at least one application, wherein if said relational and spatial database has at least one database record matching said first geographic location of interest, at least one field displayed on said graphics display within said first form is populated with a field data from said matching at least one database record associated with said at least one field;

a microphone in communication with said processing element for receiving voice input for at least one new field data into at least a one of said at least one field displayed on said graphics display within said first form, wherein said voice input is processed by a speech component of said relational and spatial database management software;

a speaker in communication with said processing element for outputting through said speech component of said relational and spatial database management software a spoken message in response to said voice input;

a pointing device in communication with said processing element;

a keyboard in communication with said processing element, wherein said pointing device and said keyboard provide a conventional input to said processing element;

a configuration component for providing application configuration data, for providing vocabulary definitions/speech configuration, for providing form definitions, for providing database definitions, and for providing map/user interface configuration for said at least one application;

said speech component for receiving said voice input picked up by said microphone, for providing said spoken message for output through said speaker, for providing and receiving field values/events and control, and for receiving said vocabulary definitions/speech configuration for said at least one application;

a forms component for receiving said conventional input from said pointing device and said keyboard, for providing form visual feedback to said graphics display, for providing and receiving sensor data/control, for receiving location data/user events, for providing and receiving field/names/values/events and database operations, for receiving said forms definitions, and for providing and receiving said field values/events and control for said at least one application;

a sensors component for providing and receiving raw sensor data/control, for receiving location data and status, for providing location data, and for providing and receiving said sensor data/control for said at least one application;

a map component for providing map visual feedback to said graphics display, for receiving record and location selection, for receiving map data, for receiving said map/user interface configuration, for receiving user spatial database display, for providing said location data user events, and for receiving said location data for said at least one application; and a database component for providing and receiving said field/names/values/events and database operations, for providing said user spatial database display, for providing and receiving user database access/update, and for receiving said database definitions for said at least one application.

4. An apparatus for relational and spatial database management according to claim 3 further comprising:

a storage device in communication with said processing element for storing said relational and spatial database management software having said at least one application having said speech component, for storing said map data, for storing said first form, and for storing said relational and spatial database.

5. An apparatus for relational and spatial database management according to claim 3 further comprising:

at least one sensor device for sensing at least one field data at said first geographic location of interest; and a communications interface in communication with said processing element and in communication with said at least one sensor device for passing said at least one field data between said at least one sensor device and said processing element.

6. An apparatus for relational and spatial database management according to claim 5 wherein said at least one sensor device is selected from the group consisting of digital cameras, video cameras, laser range finders, bar code readers, and RF scanners.

7. A computer readable media tangibly embodying a program of instructions executable by a computer to perform a method of relational and spatial database management, the method comprising:

(a) displaying a map data representing a current geographic area on a first portion of a graphics display of the computer, wherein said map data is associated with at least one application of the program of instructions loaded on the computer;

(b) displaying a first form, associated with said at least one application, on a second portion of said graphics display;

(c) moving a GPS receiver in communication with the computer to a first geographic location of interest;

(d) updating said map data displayed on said first portion of said graphics display to display a location symbol on said map data corresponding to said first geographic location of interest determined by said GPS receiver;

(e) inputting at least one field data related to a first object at said first geographic location of interest into at least one field displayed on said graphics display within said first form, wherein said inputting step is accomplished through a voice input processed by a speech component of the program of instructions loaded on the computer;

(f) outputting by said speech component a spoken message in response to said inputting of said at least one new field data;

(g) storing said at least one field data inputted for said first object in a first field database record in a field database along with a first field ID tag;

(h) retrieving said at least one field data with said first field ID tag from said first field database record stored in said field database for said first object at said first geographic location of interest;

(i) retrieving a reference field data having a reference ID tag matching said first field ID tag from a spatial/relational database;

(j) generating a corrected field data by comparing said at least one field data with said reference field data and associating a matching ID tag with said corrected field data;

(k) retrieving an uncorrected field data having an ID tag matching said matching ID tag from said spatial/relational database;

(l) correcting said uncorrected field data with said corrected field data creating a post processed spatial field data; and (m) storing said post processed spatial field data in said spatial/relational database.

8. The method according to claim 7 further comprising:

(n) moving said GPS receiver, in communication with the computer, to a second geographic location of interest; and (o) repeating steps (d) through (m) for a second object at said second geographic location of interest.

9. The method according to claim 8 further comprising:

(p) repeating steps (n) and (o) for a next object at a next geographic location of interest.

10. The method according to claim 7 wherein said inputting step is accomplished through a conventional input device and processed by a forms component of the program of instructions loaded on the computer.

11. The method according to claim 7 further comprising:

(n) repeating steps (h) through (m) for a next said at least one field data.

12. The method according to claim 7 further comprising:

(n) searching a spatial/relational database, associated with said at least one application and stored on the computer, for a database record matching said first geographic location of interest; and (o) if said database record matching said first geographic location of interest is found, populating said at least one field, displayed on said second portion of said graphics display within said first form, with a field data from said database record associated with said at least one field.

13. The method according to claim 12 further comprising:

(p) inputting at least one new field data into a one of said at least one field displayed on said graphics display within said first form;

(g) moving said GPS receiver, in communication with said computer system, to a second geographic location of interest; and (r) repeating steps (d) through (j) for said second geographic location of interest.

* * * * *

UNITED STATES PATENT AND TRADEMARK OFFICE

CERTIFICATE OF CORRECTION

PATENT NO. : 6,728,708 B1
DATED : April 27, 2004
INVENTOR(S) : Yotka et al.

It is certified that error appears in the above-identified patent and that said Letters Patent is hereby corrected as shown below:

Column 16,
Line 21, delete the word "and".
Line 51, delete the label "(g)" and replace with the label -- (q) --.

Column 20,
Line 21, delete the label "(g)" and replace with the label -- (q) --.

Signed and Sealed this

Fifteenth Day of June, 2004

JON W. DUDAS
*Acting Director of the United States Patent and Trademark Office*